May 26, 1970   FUMIO NOMURA   3,514,649
ELECTRIC MOTOR WITH BUILT-IN CENTRIFUGAL GOVERNOR
Filed April 26, 1967   4 Sheets-Sheet 1

Fumio Nomura
INVENTOR

BY Stevens, Davis, Miller & Mosher
ATTORNEY

United States Patent Office 3,514,649
Patented May 26, 1970

1

3,514,649
ELECTRIC MOTOR WITH BUILT-IN
CENTRIFUGAL GOVERNOR
Fumio Nomura, Hirakata-shi, Japan, assignor to Matsushita Electric Industrial Co., Ltd., Osaka, Japan, a corporation of Japan
Filed Apr. 26, 1967, Ser. No. 633,804
Claims priority, application Japan, Oct. 15, 1966,
41/68,234; Apr. 30, 1966 (utility model),
41/41,162; May 16, 1966 (utility model),
41/46,351; May 30, 1966 (utility model),
41/51,387
Int. Cl. H02k 7/02
U.S. Cl. 310—68    2 Claims

ABSTRACT OF THE DISCLOSURE

An electric motor for driving sewing machines at varying speeds by varying the operation point of a built-in centrifugal governor by means of a flexible wire which projects in response to actuation of a foot pedal. The electric motor has a built-in centrifugal governor section which controls the motor speed to a desired value and makes possible a wide speed control especially in a low speed rotation range, a contact assembly which can be adjusted from outside, and a cooling fan for suppressing temperature rise due to internal generation of heat.

BACKGROUND OF THE INVENTION

Field of the invention

This invention relates to electric motors with built-in centrifugal governors which are mainly used as drive motors for sewing machines for domestic use, and more particularly to a sewing machine drive motor of the structure in which a small-sized commutator motor is combined with a centrifugal governor so that the motor is capable of being controlled over a wide range under low speed rotation and easily reaching the stage of high rotation.

Description of the prior art

Electric motors with built-in centrifugal governors used to drive sewing machines for domestic use have been commonly known in the art and widely employed in the art of sewing machine drive. The prior art electric motor of this type generally comprises an electric motor section and a centrifugal governor section, and has such a structure that two resilient members or leaf springs of arcuate shape embracingly combined together at opposite ends as a unit are disposed in the centrifugal governor section and weights are mounted on opposite ends of the resilient unit so that the centrifugal force imparted to the weights by the motor rotation can cause movement of an abutment, which is mounted centrally of the arcuate leaf spring disposed on the side remote from the mounting position of the resilient unit on the rotary shaft, toward a movable contact in the centrifugal governor section.

The prior art electric motor of the type described above has a revolution-displacement characteristic as shown by the curve D in FIG. 6 and has therefore been defective in that extreme difficulty is encountered in the speed control at low speeds due to the fact that the displacement of the resilient unit of the centrifugal governor hardly takes place in the range of low speed rotation.

SUMMARY OF THE INVENTION

It is therefore the primary object of the present invention to provide a novel electric motor with a built-in centrifugal governor with which desired speed control over the whole operation range from the starting to the maximum number of revolutions can be conveniently attained while maintaining the same amount of governor displacement as that of the prior centrifugal governor as represented by the curve D in FIG. 6. More precisely, the electric motor with the built-in centrifugal governor according to the present invention is operative in such a way that its number of revolutions does not appreciably vary in a range from its starting stage to a stage of low speed rotation even with a large degree of displacement of a resilient unit in the centrifugal governor and high speed rotation is easily reached at a point beyond the range of low speed rotation.

The electric motor according to the invention is divided into an electric motor section and a centrifugal governor section. The electric motor section comprises a field core fixed by bolts and nuts between a front bracket having a plurality of projections or lugs for the proper positioning of the field core and a rear bracket having turned-over end portions at opposite ends and having a bearing centrally thereof. The centrifugal governor section comprises a fan provided with a plurality of fins on opposite faces thereof, an auxiliary resilient member, and two resilient members of arcuate shape embracingly combined together as a unit and carrying weights on opposite ends thereof. The fan, the auxiliary resilient member and the arcuate resilient members are integrally secured together for mounting on the rear end of the rotor shaft, and a movable contact strip arranged to be urged by an abutment provided centrally of one of the arcuate resilient members is disposed opposite to a speed-governing contact strip arranged to be suitably displaced by external manipulation, the movable contact strip and the speed-governing contact strip being mounted on opposite sides of a support plate of electrical insulator. The centrifugal governor section having the structure as described above is accommodated in a space defined between the rear bracket and a cover which is detachably fastened to such rear bracket.

DESCRIPTION OF THE PREFERRED EMBODIMENT

Figure 1:
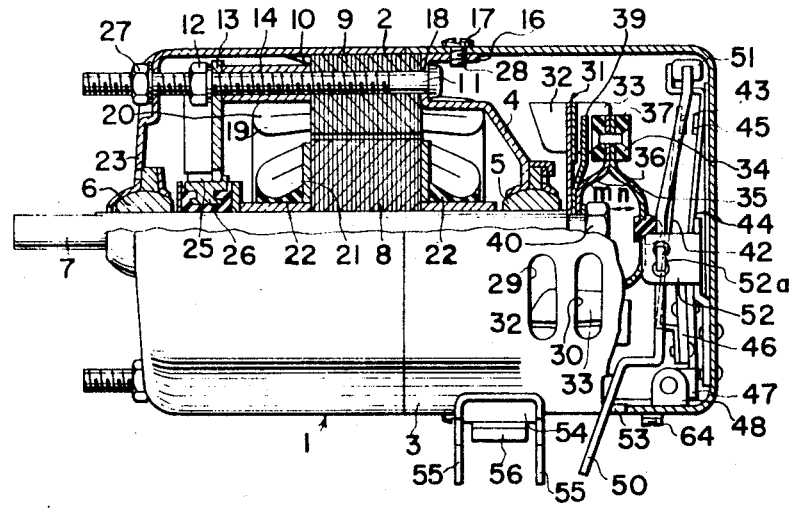
FIG. 1 is a partly sectional and partly cut-away side elevational view of an electric motor with a built-in centrifugal governor embodying the present invention.

Referring to FIG. 1, the electric motor with the built-in centrifugal governor according to the present invention comprises an outer casing generally designated by reference numeral 1, which consists of a front bracket 2 and a cover 3. A rear bracket 4 is interposed between the front bracket 2 and the cover 3 and defines the boundary between an electric motor section and a centrifugal governor section. A bearing 5 provided centrally of the rear bracket 4 and a bearing 6 provided centrally of the front bracket 2 rotatably support a rotary shaft 7 of a rotor 8. A field core 9 is fastened by bolts 11 and nuts 12 between the front wall of the rear bracket 4 and a plurality of field core positioning projections or lugs 10 provided on the front bracket 2. The bolts 11 extend through holes 18 bored near the opposite ends of the rear bracket 4 and through the field core 9 and pipes 14 firmly fixed to a brush holder 13 and are fastened by the nuts 12 for firmly securing the field core 9 in place. Opposite ends of the rear bracket 4 are turned over as shown at 16, and set screws 17 extend through holes bored through the cover 3 into aligned threaded holes 28 in the turned-over portions 16 of the rear bracket 4 so as to firmly secure the cover 3 to the rear bracket 4.

A field winding 19 extends from the opposite end faces of the field core 9 and is subjected to an electrically insulating treatment by means of an electrically insulating compound 20. Lubricating oil supply ports 23 and 24 are provided to permit supply of lubricating oil to the respective bearings 6 and 5. Brushes 25 held in place by the brush holder 13 are in face-to-face contact with commutator segments 26 for power supply to the rotor 8.

Figure 2:
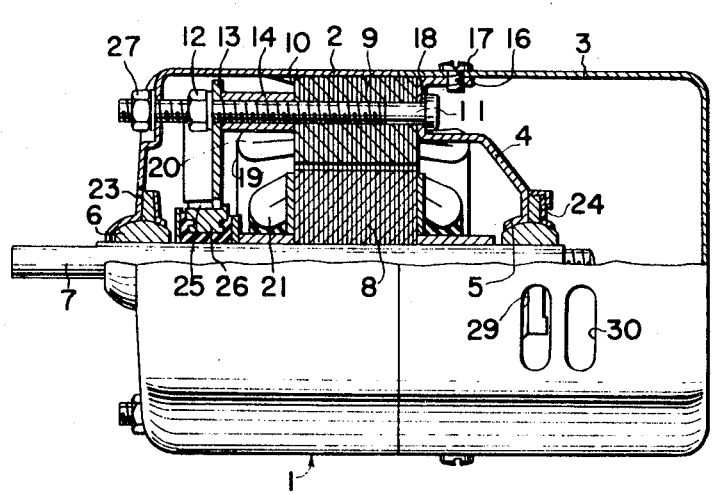
FIG. 2 is a partly sectional side elevational view of the electric motor with the built-in centrifugal governor, with its centrifugal governor section removed.
Figure 3A:
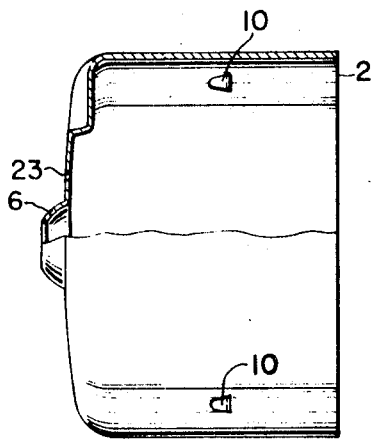
FIG. 3a is a partly sectional side elevational view of a front bracket covering the front portion of the electric motor with the built-in centrifugal governor.
Figure 3B:
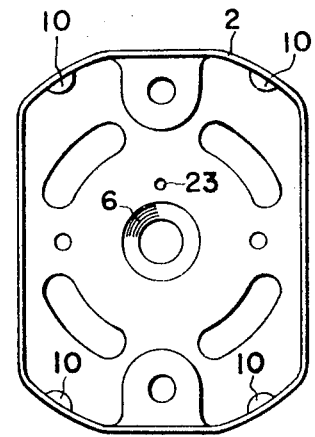
FIG. 3b is a front elevational view of the front bracket.
Figure 3C:
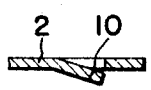
FIG. 3c is a sectional view of part of the front bracket.
Figure 5A:
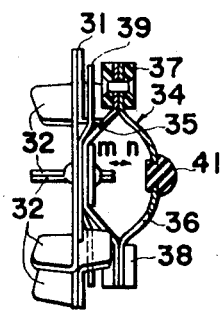
FIG. 5a is a partly sectional side elevational view of a centrifugal governor section in the electric motor with the built-in centrifugal governor.
Figure 5B:
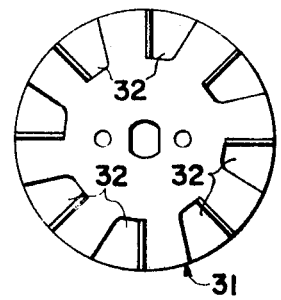
FIG. 5b is a front elevational view of the centrifugal governor section.
Figure 4:
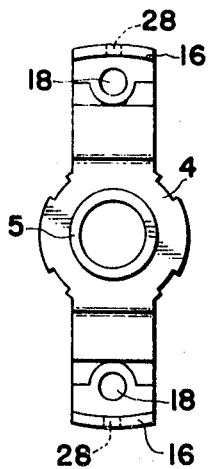
FIG. 4 is a front elevational view of a rear bracket of the electric motor with the built-in centrifugal governor.
Figure 5C:
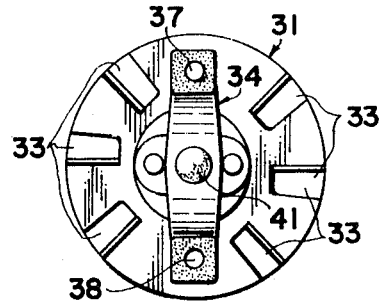
FIG. 5c is a back view of the centrifugal governor section.

In FIG. 2, the electric motor section of the electric motor with the built-in centrifugal governor is solely shown by removing the centrifugal governor section from FIG. 1. As described previously, the electric motor section has its outer shell formed by the front bracket 2 and the cover 3. The rotary shaft 7 having the rotor 8 firmly mounted thereon is rotatably journaled in the bearing 5 provided centrally of the rear bracket 4, to which the cover 3 is secured, and the bearing 6 provided centrally of the front bracket 2. The field core 9 disposed opposite to the rotor 8 is held in proper position by the lugs 10 extending inwardly from the front bracket 2 and held between the positioning lugs 10 and the rear bracket 4 by the bolts 11 and nuts 12. The bolts 11 extending through the pipes 14 cooperate with the nuts 12 to firmly secure the brush holder 13 in its proper position with respect to the field core 9 and further cooperate with nuts 27 to integrally fasten the front bracket 2 and the rear bracket 4 together. As best shown in FIG. 3c, the lugs 10 are formed by cutting a plurality of portions of the peripheral face of the front bracket 2 and causing them to flare outwardly and are arranged to abut one end face of the field core 9. The cover 3 is fastened to the rear bracket 4 by means of the set screws 17 which are in threaded engagement with the internally threaded holes 28 of the rear bracket 4. That is to say, the internally threaded holes 28 mating the set screws 17 are bored through the turned-over portions 16 of the rear bracket 4. Thus, the cover 3 is detachably fixed to the rear bracket 4 by the set screws 17, and the centrifugal governor is accommodated in the space defined between the rear bracket 4 and the cover 3. The cover 3 is provided with ventilating ports 29 and 30 for the ventilation of the interior of the motor.

Figure 6:
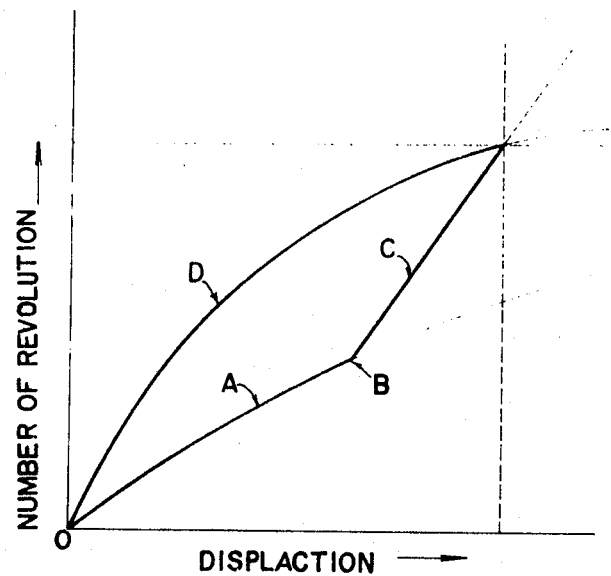
FIG. 6 is a graph showing the revolution-displacement characteristic of the centrifugal governor compared with the similar characteristic of a prior centrifugal governor.
Figure 7:
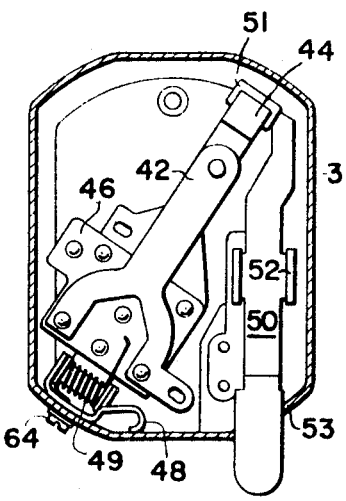
FIG. 7 is a front elevational view of a contact assembly in the centrifugal governor of the electric motor with the built-in centrifugal governor.
Figure 9:
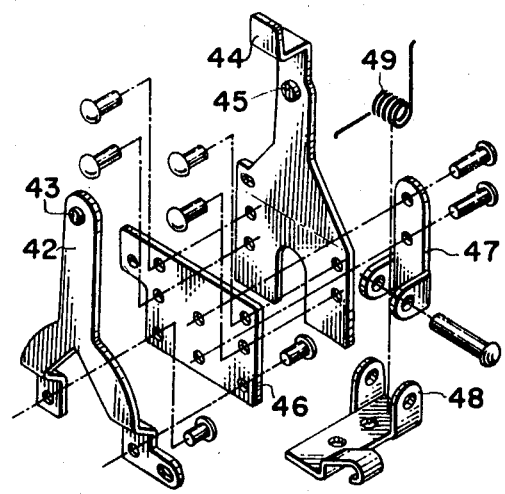
FIG. 9 is an exploded view of the contact assembly in the centrifugal governor.
Figures 8A, 8B:
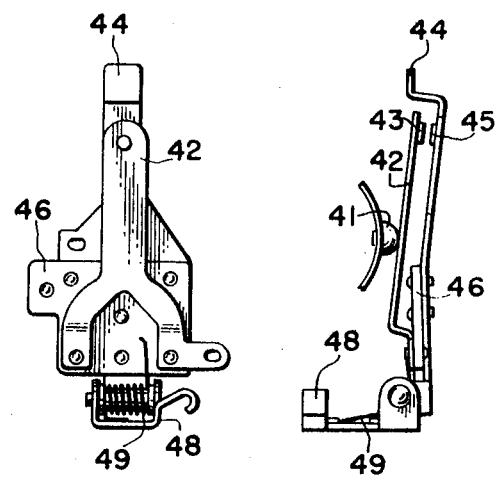
FIGS. 8a and 8b are a plan view and a side elevational view, respectively, of part of the contact assembly in the centrifugal governor.

The centrifugal governor section includes a fan 31 having a plurality of fins 32 and 33 formed on opposite faces thereof, and a resilient unit 34 formed from two resilient members 35 and 36 of arcuate shape embracingly joined together and carrying weights 37 and 38 fixedly mounted on opposite ends thereof. The two resilient members 35 and 36 of arcuate shape have a small spring constant and are urged toward each other as shown by arrow m or away from each other as shown by arrow n in FIG. 1 depending on the speed of rotation. An auxiliary resilient member 39 consisting of a single or a plurality of resilient sheets is arranged to be abutted by the weights 37 and 38 under rotation at a high speed for thereby increasing the spring constant. The resilient unit 34, auxiliary resilient member 39 and fan 31 are integrally fastened to the rear end of the rotary shaft 7 by a nut 40. It will thus be understood that, upon rotation of the rotor 8, the resilient unit 34 integrally mounted on the rotary shaft 7 contracts and expands in the directions shown by arrows m and n in FIG. 1. An abutment 41 is fixed centrally of the resilient unit 34 and makes a variable displacement as the resilient unit 34 makes expansion and contraction depending on the number of revolutions. The displacement characteristic of the abutment 41 relative to the number of revolutions is graphically shown in FIG. 6. A curve A in FIG. 6 represents the characteristic at low speed rotation, and it will be known from this curve that, due to the small spring constant of the arcuate resilient members 35 and 36, the abutment 41 makes a relatively large displacement with respect to a small variation in the number of revolutions and therefore the number of revolutions at low speeds can be easily controlled. As the axial spacing between the resilient members 35 and 36 becomes smaller at an increased number of revolutions and the entire resilient unit 34 is drawn toward the rotary shaft 7, the weights 37 and 38 on the resilient unit 34 are abutted by the auxiliary resilient member 39, and this state is represented by a break point B in FIG. 6. As the number of revolutions makes a further increase, the displacement of the abutment 41 increases along a curve C in FIG. 6.

The contact portion of the centrifugal governor section includes a movable contact strip 42 having a movable contact 43 fixedly mounted thereon, and a speed-governing contact strip 44 disposed opposite to the movable contact strip 42 and having a speed-governing contact 45 fixedly mounted thereon opposite to the movable contact 43. The movable contact strip 42 and the speed-governing contact strip 44 are mounted on opposite sides of a support plate 46 of electrical insulator. The support plate 46 is mounted on a supporting arm 47 which is mounted inside the cover 3 by means of a mounting member 48 fastened to the cover 3 by set screws 64. A coil spring 49 normally urges the support plate 46 in a direction opposite to the rotary shaft 7. A speed-governing lever 50 has a block 51 of electrical insulator mounted on its top end and is pivotally supported by a mounting member 52 fixed to the cover 3 so as to make a pivotal movement about a point 52a. The block 51 of electrical insulator is arranged to abut the top end of the speed-governing contact strip 44 to urge it toward the movable contact strip 42. The lower end of the speed-governing lever 50 extends outwardly of the cover 3 through an elongated slot 53 at the bottom of the cover 3.

Figure 10:
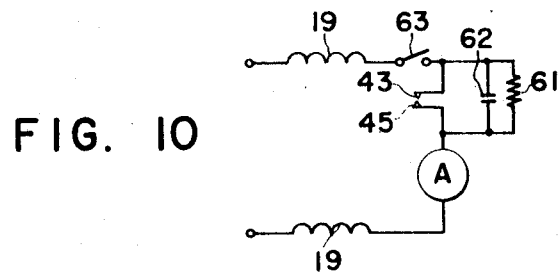
FIG. 10 is a simplified circuit diagram of the electric motor with the built-in centrifugal governor.
Figure 11A:
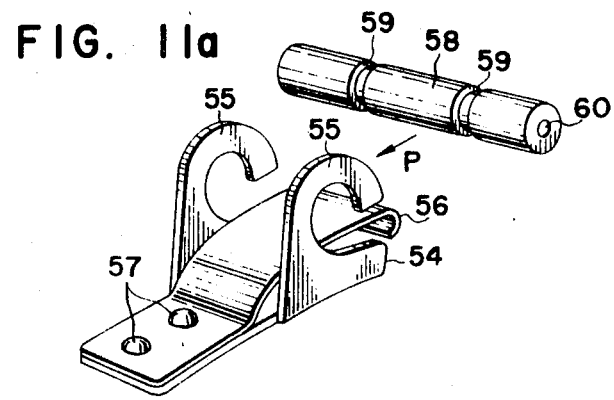
FIGS. 11a and 11b are an exploded view and a sectional side view, respectively, showing the state of mounting of a speed-governing wire in the centrifugal governor.
Figure 11B:
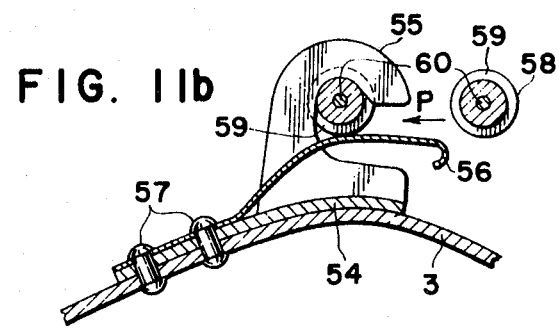

A holder 54 for a tubular end member 58 is securely fixed to the cover 3 in slightly spaced relation from the lower end of the speed-governing lever 50 and has hook-like engaging portions 55 as best shown in FIG. 11. A leaf spring 56 has one end thereof fixed to the cover 3 together with the holder 54 by rivets 57 and has its free end terminating beneath the hook-like engaging portions 55 of the holder 54. The tubular end member 58 receives therein one end of a flexible wire 60 operatively connected to actuating means such as a foot pedal (not shown), and has grooves 59 thereon which engage with the hook-like engaging portions 55 of the holder 54. The engagement between the grooves 59 of the tubular end member 58 and the hook-like engaging portions 55 of the holder 54 can be attained by urging the tubular end member 58 into the space between the engaging portions 55 and the leaf spring 56 in a direction as shown by arrow P in FIG. 11b against the resiliency of the leaf spring 56. The flexible wire 60 is urged outwardly of the tubular end member 58 in response to actuation of the foot pedal and abuts the lower end of the speed-governing lever 50 for thereby causing pivotal movement of the lever 50 about the pivot point 52a to vary the number of revolutions of the motor. Further, as shown in FIG. 10, the field winding 19, rotor winding 21, speed-governing contact 45, movable contact 43 and field winding 19 are connected in series to constitute the electrical circuit of the motor.

Referring to FIGS. 7, 8, 9 and 10, the operation of the centrifugal governor will be described. The speed-governing lever 50 is pivotally supported by the mounting member 52 so as to make pivotal movement about the pivot point 52a. The tubular end member 58 for the flexible wire 60 adapted to be actuated by means such as a foot pedal is fitted in the holder 54, and the foot pedal is actuated to cause projection of the free end of the flexible wire 60 from the tubular end member 58 to apply pressure to the lower end of the speed-governing lever 50 by the projected end of the flexible wire 60. This causes pivotal movement of the speed-governing lever 50 about the pivot point 52a, with the result that the speed-governing contact strip 44 abutted by the electrical insulator block 51 mounted on the top end of the lever 50 is displaced to bring its speed-governing contact 45 into contact with the movable contact 43, whereby the motor is placed in operation and its number of revolutions is increased. The motor rotates at a further increased speed when the flexible wire 60 is made to further project to cause an increased inclination of the speed-governing lever 50 so as to displace the speed-governing contact strip 44 to a greater degree toward the rotor 8 of the electric motor section. As will be apparent from FIG. 10, the electrical contact between the speed-governing contact 45 and the movable contact 43 establishes the power supply path and the sustained rotation can be continuously made. A resistor 61 and a capacitor 62 shown in FIG. 10 are provided to eliminate the possibility of occurrence of sparks that may be produced during the engagement and disengagement of the movable contact 43 and the speed-governing contact 45. A switch 63 is interposed in the circuit to prevent such an undesirable situation as the current remaining to flow through the resistor 61 and the capacitor 62 even after the speed-governing contact 45 is disconnected from the movable contact 43.

The electric motor with the built-in centrifugal governor having the above-described structure operates in the manner as described below. At first, the tubular end member 58 operatively connected to the foot pedal is fitted in the holder 54 for the sake of actuation of the speed-governing lever 50, and the flexible wire 60 is caused to project to apply pressure to the lower end of the speed-governing lever 50. Therefore, the speed-governing contact strip 44 is pressed against the insulator block 51, whereby said strip 44 is forced to displace and thereby the speed-governing contact 45 of said strip 44 is brought into contact with said movable contact 43 of the movable contact strip 42 to permit flow of current through the electrical circuit. The rotating speed of the rotor 8 makes a gradual increase as the speed-governing lever 50 is further urged. The rotating speed of the rotor 8 makes a continuous rise while the speed-governing contact 45 and the movable contact 43 are kept in the closed state, and the predetermined speed setting is maintained by the movement of the abutment 41 on the arcuate resilient member 36 toward and away from the movable contact strip 42.

An electric motor with a built-in centrifugal governor is commonly employed for use as a drive means for sewing machines, but the electric motor with the built-in centrifugal governor according to the invention is advantageous over the prior art motor of this type in that the speed regulation in the low rotating speed range can be easily made as explained previously with reference to FIG. 6. The weights 37 and 38 mounted on the opposite ends of the resilient unit 34 consisting of the two arcuate resilient members 35 and 36 are urged outwardly by the centrifugal force imparted thereto due to the high rotational speed, but in the event that the number of revolutions is reduced and less centrifugal force is imparted thereto, the abutment 41 abuts the movable contact strip 42 to bring the movable contact 43 into contact with the speed-governing contact 45 to provide current conduction therethrough for thereby increasing the number of revolutions of the rotor 8.

The fan 31 rotating unitarily with the rotary shaft 7 draws in external air to cool the interior of the electric motor. More precisely, as the fan 31 rotates, external air is drawn in through an air intake port at one end of the front bracket 2 or at one end of the cover 3 to cool the centrifugal governor section and the electric motor section and then flows outwardly through the ventilating ports 29 and 30. Thus, the forced cooling by the fan 31 can effectively suppress the temperature rise in the electric motor that may result from generation of Joule heat by the current flowing through the rotor winding 21 and the field winding 19 and generation of heat due to eddy current loss, hysteresis loss and the like developed in the iron cores. This forced cooling by the fan 31 is also effective in suppressing the temperature rise that may result from heat generation by sparks, Joule heat and the like developed by the engagement and disengagement between the movable contact 43 and the speed-governing contact 45 of the centrifugal governor.

The electric motor with the built-in centrifugal governor according to the invention is advantageous in that it can be made at an improved working efficiency by virtue of ease of assembling operation; the electric motor section thereof can be assembled and adjusted by removing the cover; the centrifugal governor section can be very easily mounted in place at an improved efficiency; and the electric motor has a beautiful external appearance. Provision of the means for cooling the interior of the electric motor section and the centrifugal governor section ensures a long service life of the electric motor, and the combination of the resilient unit with the auxiliary resilient member is especially effective for the precise speed control in a low speed rotation range. The present invention is further advantageous in that high speed rotation up to the maximum number of revolutions can be very precisely controlled by virtue of the fact that the combined effect of the elastic modulus of the arcuate resilient members combined as a unit and the elastic modulus of the auxiliary resilient member are operative to effectively reduce the overall spring constant and to suppress the displacement of the centrifugal governor to a small value even with an increase in the number of revolutions. Moreover, the number of revolutions can be freely varied by suitably adjusting the contact assembly. A further advantage resides in minimization of assembling errors and problems involved in assembling.

What is claimed is:

1. An electric motor with a built-in centrifugal governor comprising a front bracket (2), a rear bracket (4), a cover (3) detachably fixed to said rear bracket (4), a plurality of lugs (10) inwardly extending from said front bracket (2), a field core (9) held between said lugs (10) and said rear bracket (4), a plurality of bolts (11) extending through said rear bracket (4), said field core (9) and said front bracket (2) and engaged by nuts (27) for fastening these three members together, a plurality of turned-over portions (16) formed on opposite ends of said rear bracket (4), a rotary section mounted on the rear end of a rotary shaft (7) extending rearwardly through said rear bracket (4), said rotary section including two resilient members (35, 36) of arcuate shape having a relatively small spring constant and embracingly combined together as a resilient unit, weights (37, 38) mounted on opposite ends of said resilient unit, an auxiliary resilient member (39) and a fan (31) through which one of said arcuate resilient members (35) is connected to said rotary shaft (7), and an abutment (41) provided substantially centrally of the other said arcuate resilient member (36), a movable contact strip (42) adapted to be displaced by being urged by said abutment (41), a speed-governing contact strip (44) disposed opposite to said movable contact strip (42), a support plate (46) of electrical insulator supporting said movable contact strip (42) and said speed-governing contact strip (44) on opposite sides thereof, said support plate (46) of electrical insulator being adjustably mounted inside of said cover (3) through a spring (49) normally urging said support plate (46) in a direction opposite to the direction of force applied by said abutment (41), a speed-governing lever (50) for causing the displacement of said speed-governing contact strip (44) toward said movable contact strip (42), said speed-governing lever (50) being pivotally supported in said casing (3) and having one end thereof extending outwardly of said casing (3), and a holder (54) fixed to the external face of said cover (3) in slightly spaced relation from said end of said speed-governing lever (50) for detachably mounting therein a tubular end member (58) receiving therein a wire (60) which can be projected therefrom for applying a displacing pressure to said projected end of said speed-governing lever (50).

2. An electric motor with a built-in centrifugal governor comprising an electric motor section having a field core and a rotor supported between a front bracket and a rear bracket, a rotary section mounted on a rotary shaft extending from said rear bracket, said rotary section including two resilient members with a relatively small spring constant and weights mounted on the end portions of said resilient members, one resilient member being connected to said rotary shaft through an auxiliary resilient member and the other resilient member having an abutment, a speed-governing contact assembly arranged to be closed and opened by the contact of said abutment, and a cover covering said rotary section and said speed governing contact assembly, a movable contact strip displaced by said abutment of said resilient member and a speed-governing contact strip mounted on an insulating support plate opposing said movable contact strip, said insulating support plate being adjustably fitted to the inner side of said cover through a spring supported in the opposite direction to said abutment, a speed-governing lever for causing the displacement of said speed-governing contact strip being pivotably supported in said cover, one end of said speed-governing lever projecting outwardly of said cover, a holder provided for detachably mounting therein a metal fitting containing a wire therein and abutting the projected end of said speed-governing lever, and a holder with a metal fitting being mounted on the outer surface for placing a plate spring supporting resiliently said metal fitting opposed to said holder.

References Cited
UNITED STATES PATENTS

| | | | |
|---|---|---|---|
| 2,907,226 | 10/1959 | Gasparotti | 318—325 X |
| 2,623,962 | 12/1952 | Holstein | 318—325 X |
| 2,623,961 | 12/1952 | Holstein | 318—325 X |
| 1,577,976 | 3/1926 | Knowlson et al. | 310—68.1 |

MILTON O. HIRSHFIELD, Primary Examiner

M. O. BUDD, Assistant Examiner

U.S. Cl. X.R.

310—74; 318—325